US010838802B2

(12) United States Patent
Casmira et al.

(10) Patent No.: US 10,838,802 B2
(45) Date of Patent: Nov. 17, 2020

(54) AUTOMATED RESETTING OF STORAGE DEVICES AND REMOTE REPORTING OF ASSERT LOGS

(71) Applicant: Intel Corporation, Santa Clara, CA (US)

(72) Inventors: Jason Casmira, North Plains, OR (US); Jawad Khan, Portland, OR (US); Ambika Krishnamoorthy, Folsom, CA (US); Adrian Pearson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 16/012,294

(22) Filed: Jun. 19, 2018

(65) Prior Publication Data

US 2019/0042352 A1    Feb. 7, 2019

(51) Int. Cl.
| G06F 11/00 | (2006.01) |
| G06F 11/07 | (2006.01) |
| H04L 9/08 | (2006.01) |
| H04L 9/32 | (2006.01) |

(52) U.S. Cl.
CPC ...... *G06F 11/0793* (2013.01); *G06F 11/0727* (2013.01); *G06F 11/0751* (2013.01); *G06F 11/0766* (2013.01); *H04L 9/0825* (2013.01); *H04L 9/0869* (2013.01); *H04L 9/3271* (2013.01)

(58) Field of Classification Search
CPC ............ G06F 11/0793; G06F 11/0727; G06F 11/0751; G06F 11/0766; G06F 11/3037; H04L 9/0825; H04L 9/0869; H04L 9/3271
See application file for complete search history.

(56) References Cited

U.S. PATENT DOCUMENTS 7,293,203 B1 * 11/2007 Coatney .............. G06F 11/0727
714/42

* cited by examiner

*Primary Examiner* — Joseph D Manoskey
(74) *Attorney, Agent, or Firm* — Jordan IP Law, LLC

(57) ABSTRACT

Systems, apparatuses and methods may provide for technology to conduct, by a storage device, a state analysis of the storage device based on an assert log associated with a failure condition in the storage device. The technology may also return, by the storage device, the storage device to service if the state analysis indicates that the storage device is operable. Additionally, the technology may remove, by the storage device, the storage device from service if the state analysis indicates that the storage device is inoperable.

20 Claims, 3 Drawing Sheets

AUTOMATED RESETTING OF STORAGE DEVICES AND REMOTE REPORTING OF ASSERT LOGS

TECHNICAL FIELD

Embodiments generally relate to memory structures.

BACKGROUND

A class of storage device (e.g., drive) failure known as an "assert" may occur when, in response to a failure condition, the drive stores (e.g., "dumps") an internal log and stops normal operation. Destruction of asserted drives may be inefficient and costly, particularly if the type of assert is recoverable. Moreover, recovering asserted drives may typically involve returning the asserted drive to the manufacturer for failure analysis and/or sending troubleshooting personnel to the location of the asserted drive, which may also increase inefficiencies/cost. Additionally, returning the asserted drive to the manufacturer may present privacy and/or confidentiality concerns with respect to the information stored on the drive.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
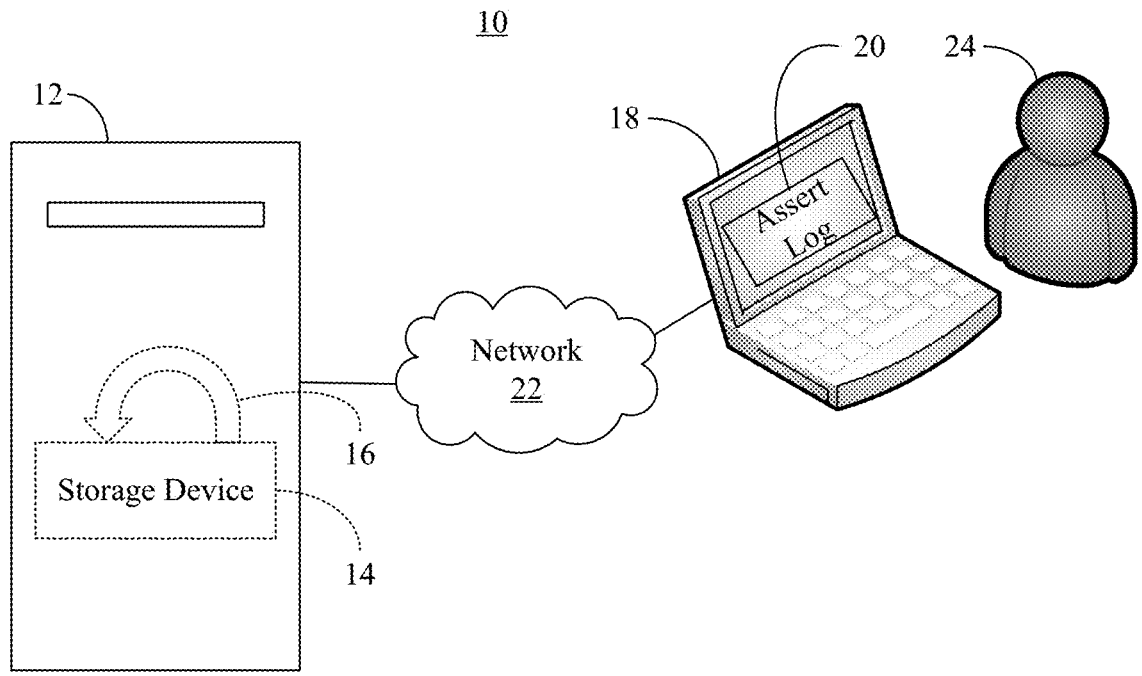
FIG. 1 is an illustration of an example of a system containing a storage device that automatically de-asserts and remotely reports an assert log to a remote system according to an embodiment.

Turning now to FIG. 1, a computing architecture 10 is shown in which a first computing system 12 includes a storage device 14 such as, for example, a solid state drive (SSD), hard disk drive (HDD), optical disc, flash memory, etc. If the storage device 14 asserts (e.g., dumps an internal log and stops normal operation) in response to a failure condition (e.g., a drive number assignment/enumeration failure) within the storage device 14, the storage device 14 may automatically de-assert 16 itself and place itself back into service if the storage device 14 is still operable. Enabling the storage device 14 to conduct the de-assert 16 while the storage device 14 remains installed in the first computing system 12 may save considerable time and cost associated with sending the storage device 14 to the manufacturer and/or sending troubleshooting personnel 24 to the location of the storage device 14.

The illustrated storage device 14 also sends an assert log 18 to a remote second computing system 20 via a network 22, wherein the assert log 18 may include, for example, an assert condition (e.g., root cause), a memory dump, a serial number, fuse information, temperature information, etc., or any combination thereof. As will be discussed in greater detail, security measures may be used with respect to the de-assert 16 and/or the transmission of the assert log 18 to the second computing system 20 to prevent unauthorized drive recoveries as well as unauthorized access to the assert log 18. The security measures may also protect other confidential/sensitive information on the storage device 14.

Figure 2:
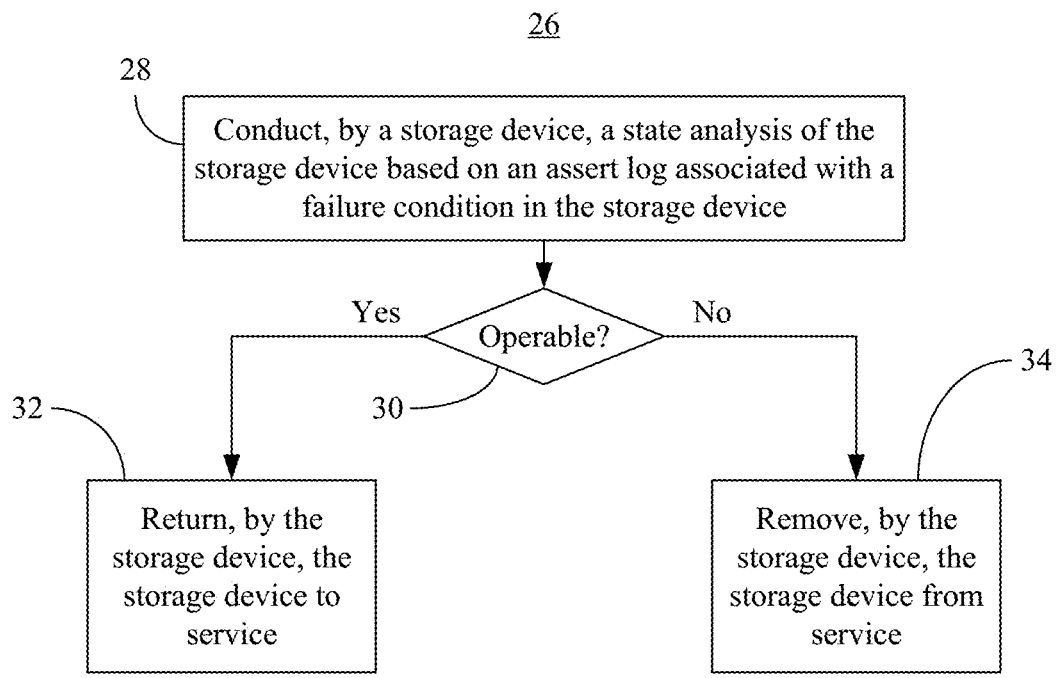
FIG. 2 is a flowchart of an example of a method of operating a storage device according to an embodiment.

FIG. 2 shows a method 26 of operating a storage device. The method 26 may generally be implemented by a storage device such as, for example, the storage device 14 (FIG. 1), already discussed. More particularly, the method 26 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 26 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 28 provides for conducting, by a storage device, a state analysis of the storage device based on an assert log associated with a failure condition in the storage device. Block 28 may involve, for example, parsing the assert log to identify a root cause of the failure condition (e.g., assert condition) and comparing the assert condition to an operability data structure (e.g., table and/or database indicating whether certain assert conditions are recoverable). Block 28 may also include analyzing a memory dump, serial number, fuse information and/or temperature information of the assert log to determine whether the storage device is recoverable/operable. For example, the fuse information might indicate that the drive failure resulted from a power surge. In such a case, the assert may have been conducted as a precautionary measure and the storage drive itself may still be operable. Other techniques to evaluate the operability of the storage device may also be used.

If the state analysis indicates at block 30 that the storage device is operable, illustrated block 32 automatically returns, by the storage device, the storage device to service. Block 32 may include, for example, resuming normal operation of the storage device, adding the storage device to an available resource data structure (e.g., table and/or database), allocating memory in the storage device to one or more processes, etc., or any combination thereof. Block 32 may also include preserving one or more counter values in the storage device during the return of the storage device to service. In this regard, the storage device may include various critical health event counters that track, for example, the total number of program/erase cycles and/or other attributes indicative of the remaining life span of the storage device. Preserving such counter values may prevent subsequent failures due to usage of the storage device beyond the expected life span. In one example, the counter values are preserved by identifying their location (e.g., register) in the storage device and bypassing the identified location during any erase or format operations that may take place.

If the state analysis indicates at block 30 that the storage device is inoperable, block 34 may remove, by the storage device, the storage device from service. Block 34 might involve, for example, removing the storage device from an available resource data structure, de-allocating memory in the storage device from one or more processes, etc., or any combination thereof.

Figure 3:
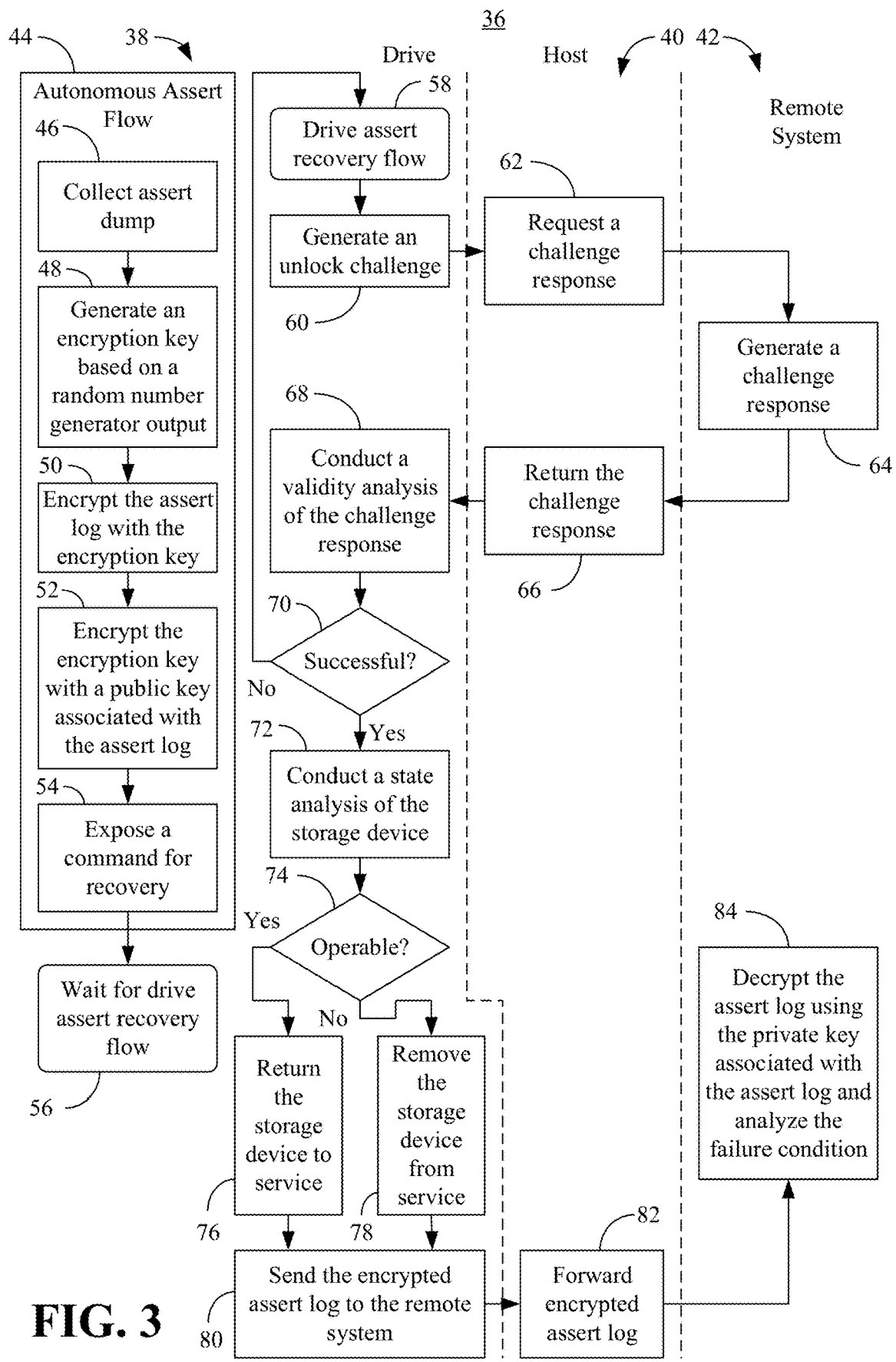
FIG. 3 is a flowchart of an example of a method of operating a computing architecture containing a storage device according to an embodiment.

FIG. 3 shows a method 36 of operating a computing architecture. The method 36 may generally be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS, TTL technology, or any combination thereof.

The illustrated method 36 generally includes a drive portion 38 that is conducted by a memory controller of a storage device, a host portion 40 that is conducted by a drive recovery tool executing on a host processor of a system containing the storage device, and a remote system portion 42 that is conducted by a remote system. An autonomous assert flow 44 of the drive portion 38 may include a processing block 46 that collects an assert dump/log. An encryption key may be generated at block 48 based on, for example, a random number generator output, wherein illustrated block 50 encrypts the assert log with the encryption key. Additionally, block 52 may encrypt the encryption key with a public key associated with the assert log. Block 54 may expose a command (e.g., local de-assert request command, which may be generic or drive vendor/manufacturer unique) for recovery. Illustrated block 56 waits for a drive assert recovery flow to be initiated (e.g., by the issuance of a local de-assert request).

When the drive assert recovery flow is initiated at block 58, an unlock challenge may be generated at block 60 in response to the drive assert recovery flow. The unlock challenge may be a random piece of data generated by the storage device. The random piece of data may be different from the random number generator output used in block 48 to generate the encryption key. In the illustrated example, a challenge request is sent to the remote system at block 62, wherein the remote system may generate a challenge response to the challenge request at block 64. Block 64 may include digitally signing the unlock challenge with a signature associated with the remote system. Illustrated block 66 returns the challenge response to the drive, which may conduct a validity analysis of the challenge response at block 68. The validity analysis may include verifying the digital signature applied to the unlock challenge. If it is determined at block 70 that the validity analysis is unsuccessful (e.g., unrecognized and/or invalid signature), the method may return to block 58 (or implement a timeout exit).

Block 72 may conduct a state analysis in response to a determination that the validity analysis is successful (e.g., recognized and/or valid signature). As already noted, the state analysis may involve, for example, parsing the assert log to identify a root cause of the failure condition (e.g., assert condition) and comparing the assert condition to an operability data structure (e.g., table and/or database indicating whether certain assert conditions are recoverable). Block 72 may also include analyzing a memory dump, serial number, fuse information and/or temperature information of the assert log to determine whether the storage device is recoverable/operable.

If the state analysis indicates at block 74 that the storage device is operable, illustrated block 76 automatically returns, by the storage device, the storage device to service. Block 76 may include, for example, resuming normal operation of the storage device, adding the storage device to an available resource data table and/or database, allocating memory in the storage device to one or more processes, etc., or any combination thereof. As already noted, block 76 may also include preserving one or more counter values in the storage device during the return of the storage device to service. If the state analysis indicates at block 74 that the storage device is inoperable, block 78 may remove, by the storage device, the storage device from service. Block 78 might involve, for example, removing the storage device from an available resource data structure, de-allocating memory in the storage device from one or more processes, etc., or any combination thereof.

Illustrated block 80 sends the encrypted assert log to the remote system. Block 80 may also send the encrypted encryption key from block 52 to the remote system. Block 82 may forward the encrypted assert log (and potentially the encrypted encryption key) to the remote system, which decrypts the assert log at illustrated block 84 using the private key associated with the assert log. Block 84 may also analyze the failure condition.

Figure 4:
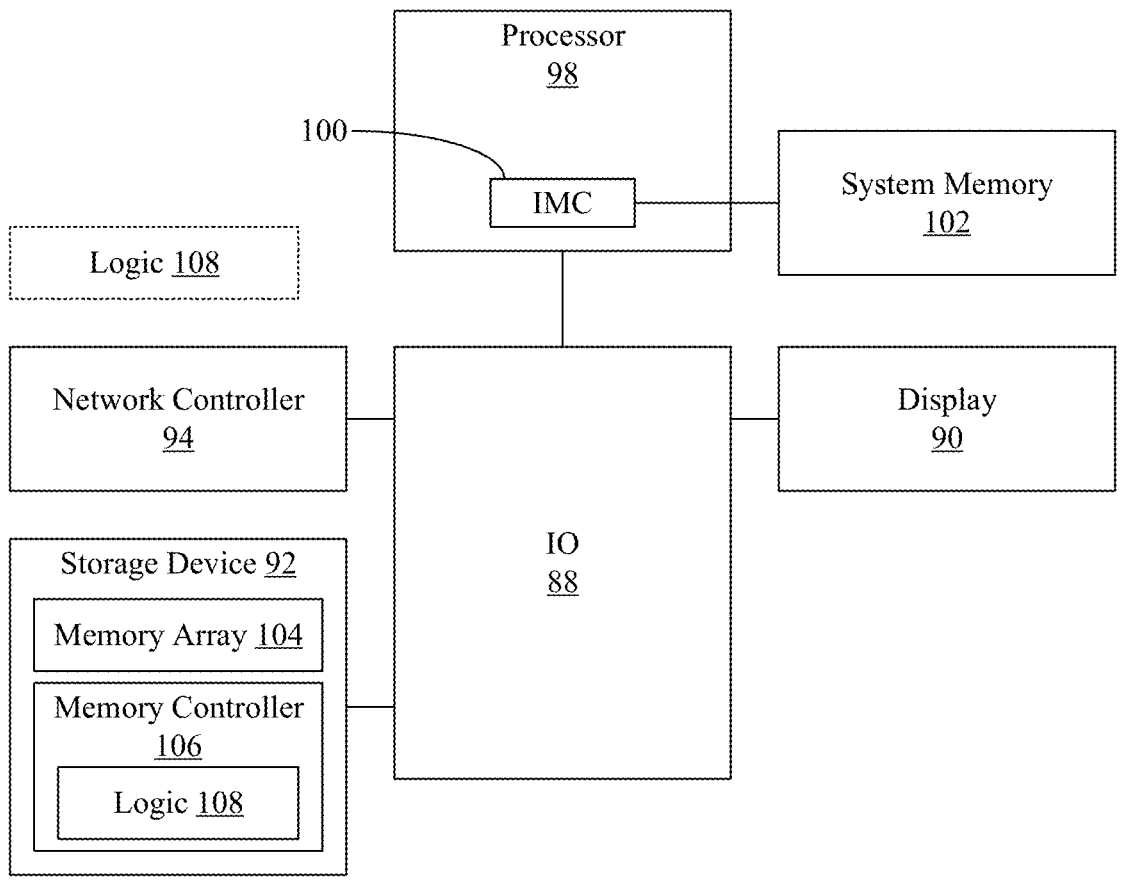
FIG. 4 is a block diagram of an example of a computing system according to an embodiment.

Turning now to FIG. 4, a performance-enhanced computing system 86 is shown. The system 86 may generally implement one or more aspects of the method 26 (FIG. 2) and/or the method 36 (FIG. 3), already discussed. Accordingly, the system 86 may be readily substituted for the first computing system 12 (FIG. 1), already discussed. The system 86 may be part of a server, desktop computer, notebook computer, tablet computer, convertible tablet, smart television (TV), personal digital assistant (PDA), mobile Internet device (MID), smart phone, wearable device, media player, vehicle, robot, etc., or any combination thereof. In the illustrated example, an input/output (IO) module 88 is communicatively coupled to a display 90 (e.g., liquid crystal display/LCD, light emitting diode/LED display, touch screen), a storage device 92 (e.g., SSD, HDD, optical disk, flash memory), and a network controller 94 (e.g., wired, wireless).

The system 86 may also include a processor 98 (e.g., central processing unit/CPU) that includes an integrated memory controller (IMC) 100, wherein the illustrated IMC 100 communicates with a system memory 102 over a bus or other suitable communication interface. The processor 98 and the IO module 88 may be integrated onto a shared semiconductor die (not shown) in a system on chip (SoC) architecture.

The illustrated storage device 92 includes a memory array 104 and a memory controller 106. The memory controller 106 may include logic 108 that implements one or more aspects of the method 26 (FIG. 2) and/or the method 36 (FIG. 3), already discussed. Thus, the logic 108 may conduct a state analysis of the storage device 92 based on an assert log associated with a failure condition in the storage device 92 and return the storage device 92 to service if the state analysis indicates that the storage device 92 is operable. As already noted, one or more counter values in the storage device 92 may be preserved during the return of the storage device 92 to service. The logic 108 may also remove the storage device 92 from service if the state analysis indicates that the storage device 92 is inoperable.

In one example, the logic 108 sends a challenge request to a remote system (not shown), receives a challenge response from the remote system, and conducts a validity analysis of the challenge response, wherein the state analysis is conducted in response to the validity analysis being successful. The challenge request and the challenge response may be exchanged via the network controller 94. Moreover, the challenge request may be sent to the remote system in response to a local de-assert request. The challenge handshake may prevent unauthorized replay of the de-assertion.

The logic 108 may also generate an encryption key, encrypt the assert log with the encryption key, encrypt the encryption key with a public key associated with the assert log, and send the encrypted encryption key and the encrypted assert log to the remote system. The encrypted assert log and the encrypted encryption key may be exchanged via the network controller 94. In one example, the encryption key is generated based on a random number generator output. The automated reporting of the assert log to the remote system may be linked to the de-assertion functionality or independent of the de-assertion functionality, depending on the circumstances (e.g., whether a premium payment structure is used). Although the logic 108 as shown as being located within the memory controller 106, the logic 108 may be located elsewhere in the system 86.

The memory array 104 may include either volatile memory or non-volatile memory. Non-volatile memory is a storage medium that does not require power to maintain the state of data stored by the medium. In one embodiment, the storage device 92 is a block addressable storage device, such as those based on NAND or NOR technologies. A storage device may also include future generation nonvolatile devices, such as a three dimensional (3D) crosspoint memory device, or other byte addressable write-in-place nonvolatile memory devices. In one embodiment, the storage device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The storage device 92 may refer to the die itself and/or to a packaged memory product. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

Figure 5:
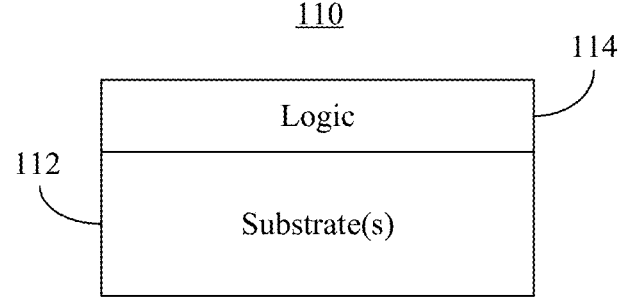
FIG. 5 is an illustration of an example of a semiconductor package apparatus according to an embodiment.

FIG. 5 shows a semiconductor package apparatus 110 (e.g., chip, die) that includes one or more substrates 112 (e.g., silicon, sapphire, gallium arsenide) and logic 114 (e.g., transistor array and other integrated circuit/IC components) coupled to the substrate(s) 112. The logic 114, which may be implemented at least partly in configurable logic and/or fixed-functionality hardware logic, may generally implement one or more aspects of the method 26 (FIG. 2) and/or the method 36 (FIG. 3), already discussed. Thus, the logic 114 may conduct, by a storage device, a state analysis of the storage device based on an assert log associated with a failure condition in the storage device, return, by the storage device, the storage device to service if the state analysis indicates that the storage device is operable, and remove, by the storage device, the storage device from service if the state analysis indicates that the storage device is inoperable.

In one example, the logic 114 includes transistor channel regions that are positioned (e.g., embedded) within the substrate(s) 112. Thus, the interface between the logic 114 and the substrate(s) 112 may not be an abrupt junction. The logic 114 may also be considered to include an epitaxial layer that is grown on an initial wafer of the substrate(s) 112.

Additional Notes and Examples

Example 1 may include a semiconductor apparatus comprising one or more substrates and logic coupled to the one or more substrates, wherein the logic is implemented at least partly in one or more of configurable logic or fixed-functionality hardware logic, the logic coupled to the one or more substrates to send, by a storage device, a challenge request to a remote system, wherein the challenge request is sent in response to a local de-assert request, receive, by the storage device, a challenge response from the remote system, conduct, by the storage device, a validity analysis of the challenge response, conduct, by the storage device, a state analysis of the storage device based on an assert log associated with a failure condition in the storage device, wherein the state analysis is conducted in response to the validity analysis being successful, return, by the storage device, the storage device to service if the state analysis indicates that the storage device is operable, wherein the logic coupled to the one or more substrates is to preserve one or more counter values in the storage device during the return of the storage device to service, and remove, by the storage device, the storage device from service if the state analysis indicates that the storage device is inoperable.

Example 2 may include the semiconductor apparatus of Example 1, wherein the logic coupled to the one or more substrates is to generate, by the storage device, an encryption key, encrypt, by the storage device, the assert log with the encryption key, encrypt, by the storage device, the encryption key with a public key associated with the assert log, and send, by the storage device, the encrypted encryption key and the encrypted assert log to the remote system.

Example 3 may include the semiconductor apparatus of Example 2, wherein the encryption key is generated based on a random number generator output.

Example 4 may include the semiconductor apparatus of Example 1, wherein the assert log is to include one or more of an assert condition, a memory dump, a serial number, fuse information or temperature information.

Example 5 may include a system comprising a host processor, a network controller, and a storage device including a memory array and a memory controller coupled to the memory array, the memory controller including logic to conduct a state analysis of the storage device based on an assert log associated with a failure condition in the storage device, return the storage device to service if the state analysis indicates that the storage device is operable, and remove the storage device from service if the state analysis indicates that the storage device is inoperable.

Example 6 may include the system of Example 5, wherein the logic coupled to the one or more substrates is to send a challenge request to a remote system, receive a challenge response from the remote system, and conduct a validity analysis of the challenge response, wherein the state analysis is conducted in response to the validity analysis being successful.

Example 7 may include the system of Example 6, wherein the challenge request is sent in response to a local de-assert request.

Example 8 may include the system of Example 5, wherein the logic coupled to the one or more substrates is to generate an encryption key, encrypt the assert log with the encryption key, encrypt the encryption key with a public key associated with the assert log, and send the encrypted encryption key and the encrypted assert log to the remote system.

Example 9 may include the system of Example 8, wherein the encryption key is generated based on a random number generator output.

Example 10 may include the system of Example 5, wherein the logic coupled to the one or more substrates is to preserve one or more counter values in the storage device during the return of the storage device to service.

Example 11 may include the system of Example 5, wherein the assert log is to include one or more of an assert condition, a memory dump, a serial number, fuse information or temperature information.

Example 12 may include a semiconductor apparatus comprising one or more substrates, and logic coupled to the one or more substrates, wherein the logic is implemented at least partly in one or more of configurable logic or fixed-functionality hardware logic, the logic coupled to the one or more substrates to conduct, by a storage device, a state analysis of the storage device based on an assert log associated with a failure condition in the storage device, return, by the storage device, the storage device to service if the state analysis indicates that the storage device is operable, and remove, by the storage device, the storage device from service if the state analysis indicates that the storage device is inoperable.

Example 13 may include the semiconductor apparatus of Example 12, wherein the logic coupled to the one or more substrates is to send, by the storage device, a challenge request to a remote system, receive, by the storage device, a challenge response from the remote system, and conduct, by the storage device, a validity analysis of the challenge response, wherein the state analysis is conducted in response to the validity analysis being successful.

Example 14 may include the semiconductor apparatus of Example 13, wherein the challenge request is sent in response to a local de-assert request.

Example 15 may include the semiconductor apparatus of Example 12, wherein the logic coupled to the one or more substrates is to generate, by the storage device, an encryption key, encrypt, by the storage device, the assert log with the encryption key, encrypt, by the storage device, the encryption key with a public key associated with the assert log, and send, by the storage device, the encrypted encryption key and the encrypted assert log to the remote system.

Example 16 may include the semiconductor apparatus of Example 15, wherein the encryption key is generated based on a random number generator output.

Example 17 may include the semiconductor apparatus of Example 12, wherein the logic coupled to the one or more substrates is to preserve one or more counter values in the storage device during the return of the storage device to service.

Example 18 may include the semiconductor apparatus of Example 12, wherein the assert log is to include one or more of an assert condition, a memory dump, a serial number, fuse information or temperature information.

Example 19 may include a method comprising conducting, by a storage device, a state analysis of the storage device based on an assert log associated with a failure condition in the storage device, returning, by the storage device, the storage device to service if the state analysis indicates that the storage device is operable, and removing, by the storage device, the storage device from service if the state analysis indicates that the storage device is inoperable.

Example 20 may include the method of Example 19, further including sending, by the storage device, a challenge request to a remote system, receiving, by the storage device, a challenge response from the remote system, and conducting, by the storage device, a validity analysis of the challenge response, wherein the state analysis is conducted in response to the validity analysis being successful.

Example 21 may include the method of Example 20, wherein the challenge request is sent in response to a local de-assert request.

Example 22 may include the method of Example 19, further including generating, by the storage device, an encryption key, encrypting, by the storage device, the assert log with the encryption key, encrypting, by the storage device, the encryption key with a public key associated with the assert log, and sending, by the storage device, the encrypted encryption key and the encrypted assert log to the remote system.

Example 23 may include the method of Example 22, wherein the encryption key is generated based on a random number generator output.

Example 24 may include the method of Example 19, wherein returning the storage device to service includes preserving one or more counter values in the storage device.

Example 25 may include the method of Example 19, wherein the assert log includes one or more of an assert condition, a memory dump, a serial number, fuse information or temperature information.

Technology described herein may therefore enable secure and remote de-asserting of drives at the installation location. The de-asserting process may also involve sending the assert log to the drive manufacturer. The transmitted assert log may include only metadata concerning the state of the drive when the assert occurred so that privacy and/or confidentiality concerns may be obviated. Moreover, the assert log may enable upgrades and/or other performance enhancements to be developed and deployed without the dispatch of troubleshooting personnel. The drive may generate and encrypt the assert log (as well as a securely encrypted key) to further enhance privacy. An interactive signed challenge may also be used. Accordingly, drive manufacturers may obtain failed drive information from a class of users that may not conduct a return merchandise authorization (RMA) due to security or proprietary concerns. This information may be used to increase the pool of knowledge about drive failure types. Simply put, drive recovery may be achieved at scale, securely and in a non-intrusive manner from the perspective of the drive owner.

Additionally, drive owners may extend the total service time of a drive, thus lowering the total cost of ownership (TCO). For example, in cases where an unfortunate event (e.g., power surge, operator error) has triggered a failure condition in (e.g., "bricked") several drives early in the life of the product, significant cost savings and efficiencies may be achieved by automatically de-asserting (e.g., via a system agent or management console) the drives in-place. Furthermore, the technology described herein may simplify deployment of the de-assert feature for all customers and obviate any need for a special build for each drive owner with vendor unique commands.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
send, by a storage device, a challenge request to a remote system, wherein the challenge request is sent in response to a local de-assert request,
receive, by the storage device, a challenge response from the remote system,
conduct, by the storage device, a validity analysis of the challenge response,
conduct, by the storage device, a state analysis of the storage device based on an assert log associated with a failure condition in the storage device, wherein the state analysis is conducted in response to the validity analysis being successful,
return, by the storage device, the storage device to service if the state analysis indicates that the storage device is operable, wherein the logic coupled to the one or more substrates is to preserve one or more counter values in the storage device during the return of the storage device to service, and
remove, by the storage device, the storage device from service if the state analysis indicates that the storage device is inoperable.

2. The semiconductor apparatus of claim 1, wherein the logic coupled to the one or more substrates is to:
generate, by the storage device, an encryption key,
encrypt, by the storage device, the assert log with the encryption key,
encrypt, by the storage device, the encryption key with a public key associated with the assert log, and
send, by the storage device, the encrypted encryption key and the encrypted assert log to the remote system.

3. The semiconductor apparatus of claim 2, wherein the encryption key is generated based on a random number generator output.

4. The semiconductor apparatus of claim 1, wherein the assert log is to include one or more of an assert condition, a memory dump, a serial number, fuse information or temperature information.

5. A system comprising:
a host processor;
a network controller; and
a storage device including a memory array and a memory controller coupled to the memory array, the memory controller including logic to:
conduct a state analysis of the storage device based on an assert log associated with a failure condition in the storage device, wherein the state analysis is conducted in response to a validity analysis of a challenge response being successful,
return the storage device to service if the state analysis indicates that the storage device is operable, and
remove the storage device from service if the state analysis indicates that the storage device is inoperable.

6. The system of claim 5, wherein the logic coupled to the one or more substrates is to:
send the challenge request to a remote system,
receive the challenge response from the remote system, and
conduct a validity analysis of the challenge response, wherein the state analysis is conducted in response to the validity analysis being successful.

7. The system of claim 6, wherein the challenge request is sent in response to a local de-assert request.

8. The system of claim 5, wherein the logic coupled to the one or more substrates is to:
generate an encryption key,
encrypt the assert log with the encryption key,
encrypt the encryption key with a public key associated with the assert log, and
send the encrypted encryption key and the encrypted assert log to a remote system.

9. The system of claim 8, wherein the encryption key is generated based on a random number generator output.

10. The system of claim 5, wherein the logic coupled to the one or more substrates is to preserve one or more counter values in the storage device during the return of the storage device to service.

11. The system of claim 5, wherein the assert log is to include one or more of an assert condition, a memory dump, a serial number, fuse information or temperature information.

12. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
conduct, by a storage device, a state analysis of the storage device based on an assert log associated with a failure condition in the storage device, wherein the state analysis is conducted in response to a validity analysis of a challenge response being successful,
return, by the storage device, the storage device to service if the state analysis indicates that the storage device is operable, and
remove, by the storage device, the storage device from service if the state analysis indicates that the storage device is inoperable.

13. The semiconductor apparatus of claim 12, wherein the logic coupled to the one or more substrates is to:
send, by the storage device, the challenge request to a remote system,
receive, by the storage device, the challenge response from the remote system, and
conduct, by the storage device, a validity analysis of the challenge response, wherein the state analysis is conducted in response to the validity analysis being successful.

14. The semiconductor apparatus of claim 13, wherein the challenge request is sent in response to a local de-assert request.

15. The semiconductor apparatus of claim 12, wherein the logic coupled to the one or more substrates is to:
generate, by the storage device, an encryption key,
encrypt, by the storage device, the assert log with the encryption key,
encrypt, by the storage device, the encryption key with a public key associated with the assert log, and
send, by the storage device, the encrypted encryption key and the encrypted assert log to a remote system.

16. The semiconductor apparatus of claim 15, wherein the encryption key is generated based on a random number generator output.

17. The semiconductor apparatus of claim 12, wherein the logic coupled to the one or more substrates is to preserve one or more counter values in the storage device during the return of the storage device to service.

18. The semiconductor apparatus of claim 12, wherein the assert log is to include one or more of an assert condition, a memory dump, a serial number, fuse information or temperature information.

19. A method comprising:
conducting, by a storage device, a state analysis of the storage device based on an assert log associated with a failure condition in the storage device, wherein the state analysis is conducted in response to a validity analysis of a challenge response being successful;
returning, by the storage device, the storage device to service if the state analysis indicates that the storage device is operable; and
removing, by the storage device, the storage device from service if the state analysis indicates that the storage device is inoperable.

20. The method of claim 19, further including:
sending, by the storage device, the challenge request to a remote system;
receiving, by the storage device, the challenge response from the remote system; and
conducting, by the storage device, a validity analysis of the challenge response, wherein the state analysis is conducted in response to the validity analysis being successful.

* * * * *